Figure 1A:
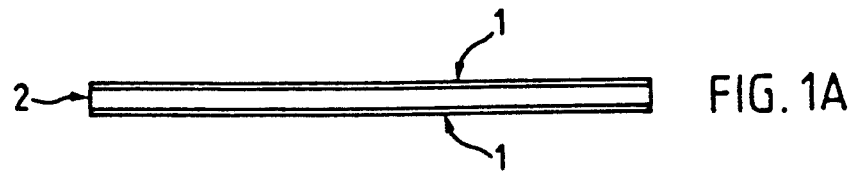
Figure 1B:
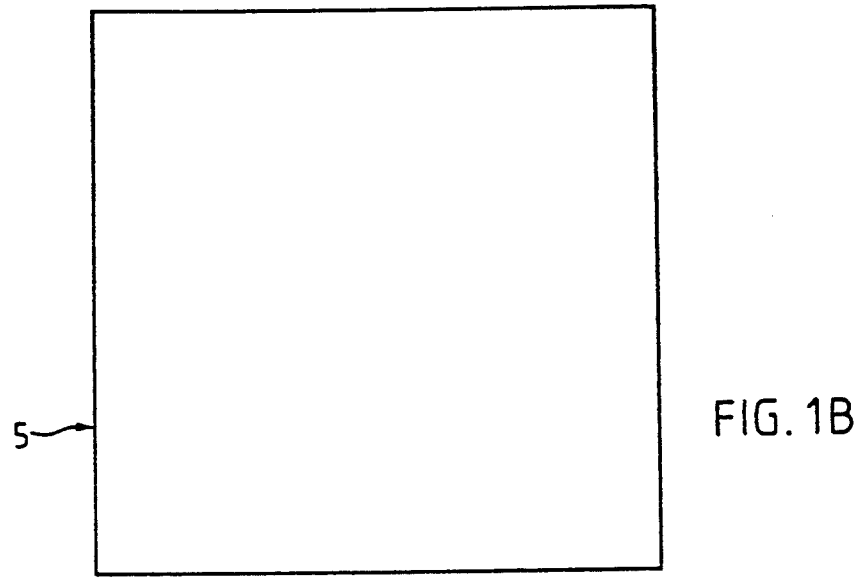
Figure 1C:
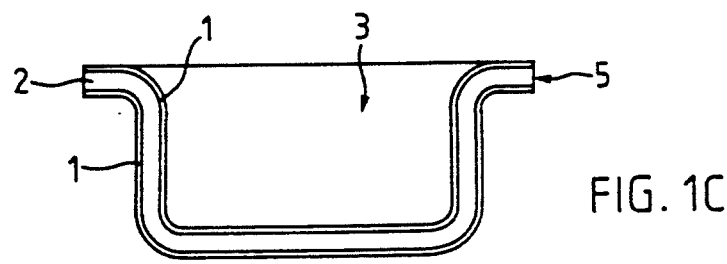
Figure 1D:
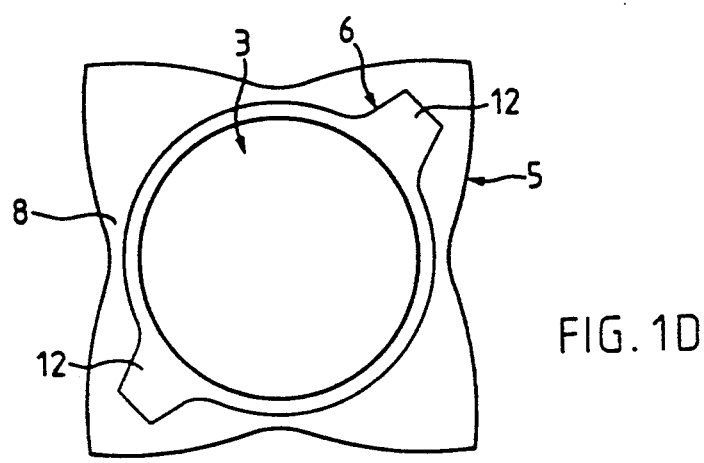

United States Patent [19]

Kuhn

[11] Patent Number: 5,307,951
[45] Date of Patent: May 3, 1994

[54] METAL UTENSIL

[75] Inventor: Jacques Kuhn, Rikon im Tösstal, Switzerland

[73] Assignee: Heinrich Kuhn Metallwarenfabrik AG, Rikon, Switzerland

[21] Appl. No.: 859,969

[22] Filed: Mar. 30, 1992

[30] Foreign Application Priority Data

Apr. 30, 1991 [CH] Switzerland .................. 01295/91

[51] Int. Cl.⁵ .............................................. A47J 37/00
[52] U.S. Cl. ........................................ 220/771; 220/912
[58] Field of Search ............... 220/912, 753, 756, 769, 220/771, 574, 366, 926

[56] References Cited

U.S. PATENT DOCUMENTS

| | | | |
|---|---|---|---|
| 1,926,240 | 9/1933 | Maas | 220/366 X |
| 2,289,037 | 7/1942 | Poglein | 220/771 X |
| 2,515,617 | 7/1950 | Tilford | 220/912 X |
| 2,722,173 | 11/1955 | Cunningham | 220/912 X |
| 3,648,887 | 3/1972 | Hartley | 220/753 X |
| 4,491,235 | 1/1985 | Fournier et al. | 220/912 X |
| 4,596,236 | 6/1986 | Eide | 220/626 X |

FOREIGN PATENT DOCUMENTS

| | | |
|---|---|---|
| 808377 | of 1951 | Fed. Rep. of Germany . |
| 9001134 | 2/1990 | Fed. Rep. of Germany . |
| 2582209 | 11/1986 | France . |
| 90/09133 | 2/1989 | PCT Int'l Appl. . |
| 2181634 | 4/1987 | United Kingdom . |

Primary Examiner—Steven M. Pollard
Attorney, Agent, or Firm—Walter C. Farley

[57] ABSTRACT

The invention shows how a metal utensil with handles shaped onto the marginal portions thereof can be manufactured in a simple, material-saving manner. Such a utensil can be used in a more universal manner than conventional utensils.

The metal utensil comprising the container part (10) and/or the lid part (15), with handles (4) for holding the utensil, is characterized in that the handle parts have at least one handle attachment (12) for fixing a handle (4) shaped onto the rim of the opening.

As a result of the special shaping of the handle attachments a system utensil is obtained, with e.g. significantly improved stackability, reciprocal usability, e.g. bain marie cooking and more extensive uses, e.g. as a pouring, steaming or sieving vessel. Through shaping and the use of heat distributing laminated materials a local overheating in the vessel is virtually impossible and a uniform heat distribution over the entire vessel surface is ensured. The handle attachments 12, e.g. as carriers of heat insulating handle parts (4), can be extended a long way out, which ensures a maximum distance from the heat source.

5 Claims, 5 Drawing Sheets

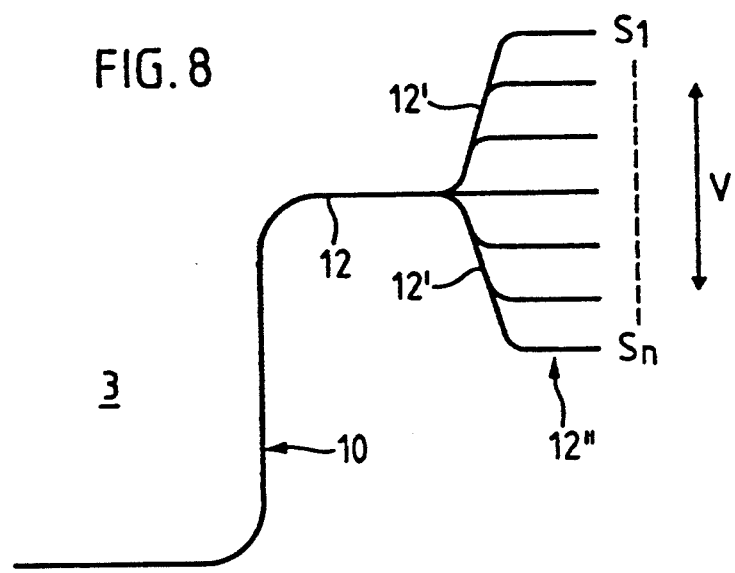

METAL UTENSIL

The invention relates to metal pots and pans, containers and/or lids, intended more particularly for use as cooking utensils. The metal utensils are formed into a utensil system as a result of their specific shaping.

Cooking utensils are generally multipurpose utensils and must therefore have a wide spectrum of characteristics. More particular significance is attached to characteristics such as the chemical and mechanical resistance of the surface, safe and easy handling (ergonomy) so as to keep accident risks low when cooking, together with the shape of the utensil adapted to the particular cooking function and the ease of cleaning. Significance is also attached to the thermal characteristics (material and material combinations) of such a utensil and finally robustness and at the same time a low weight. It is to be assumed that all these characteristics cannot be combined in optimum manner is a single utensil and therefore every utensil is to a certain extent a compromise.

Cleanness or hygiene requirements make it impossible for such utensils to have difficulty cleanable points such as joints, e.g. on and around handle and grip attachments. Normally such grips are attached to the outer wall of the utensil, either by rivets, or by a soldered/welded joint. In many cases the handles are a relatively limited distance above the heat source, so that they can easily become heated. Utensils used in commercial kitchens are not thermally insulated at the handles, so that such insulating materials cannot suffer as a result of the heat or the rough handling in such kitchens. Such vessel handles are bulky and do not allow a space-saving stacking of the cooking utensils. This makes difficult or even impossible bain marie or double saucepan cooking with cooking utensils of different sizes fitted in one another.

A metal utensil having handles not suffering from such disadvantages and also having further advantages would be desirable and is brought about by the invention described hereinafter.

The invention shows how a metal utensil with hand grips or handles shaped out of the marginal part of the utensil can be manufactured in simple, material-saving manner. Such a utensil can be used in a much more universal manner than conventional cooking utensils.

Information already exists on the provision of vessel handles mainly on non-metallic cooking utensils, but in the case of metallic utensils this has not proved successful for different reasons. Thus, German Utility Model G 90 01 134.1 discloses a utensil having a shaped on rim, which cooperates with the lid and which is also constructed for grasping and picking up. These vessels are made from ceramic, glass or plastic and are mainly intended for use in microwave equipment. A similar construction is disclosed in WO 90/09133 of the same Applicant, namely a metal cooking utensil, but the shaped on part only serves as a pouring rim or edge. For handling purposes such utensils have the usual vessel grips or handles. This utensil also cooperates with the lid so as to allow a better pouring off of the boiling product.

In neither case is there a shaped on vessel handle, although it would lead to considerable advantages. With such a handle in the case of metal utensils the aforementioned disadvantages would be avoided and additional advantages obtained. Importance is also attached to the stability of the utensil, particularly the container, whose strength in the hot and cold state and during loading through handling when cooking must always be adequate. However, this cannot be brought about by the utensil or parts thereof being made from very thick sheet metal in order to ensure such strength. For example with stainless steel, the disadvantages would be the poor thermal conductivity and high weight, whereas in the case of light metal the limited strength and the surface unprotected against discolouration and oxidation. In this connection the invention uses for the entire cooking utensil a laminated material, whose structure corresponds to the bottom parts of conventional stainless cooking utensils. The laminated materials can be constituted by relatively thin, stainless steel sheets combined with a good heat conducting metal, e.g. aluminum in a thickness with which the strength deficiency of thin steel sheets is compensated. The resulting improved heat distribution not only extends to the bottom part, but to the entire surface of the cooking utensil. In this way a fully encapsulated system utensil is obtained.

This leads to the two advantages of a good heat distribution through the core material, e.g. aluminum and increased strength resulting from the plating of thin, stainless sheets. As a result of its strength, this makes it possible to shape random handles and grips from the utensil edge or rim allowing the special shaping of the handle attachments for a system utensil with e.g. improved stackability, reciprocal usability, e.g. bain marie cooking and more universal usage, e.g. as a steaming, sieving or pouring vessel. Through shaping and using heat distributing laminated materials, a local overheating within the vessel is virtually impossible. As the laminated material is characterized by high strength, the handles can be extended further outwards, so that they are positioned outside and well above the heat source and do not get in the way on fitting the vessels in one another.

The invention is described in greater detail hereinafter relative to non-limitative embodiments and the attached drawings, wherein show:

FIG. 1 In parts A to D the basic manufacturing process of a metal utensil according to the invention.

FIG. 2 In two parts A and B partly in elevation and in section a fully encapsulated utensil, namely a container and a matching lid, part B showing a possible embodiment of the handles seen in the direction of the centre of the container.

Figure 2A:
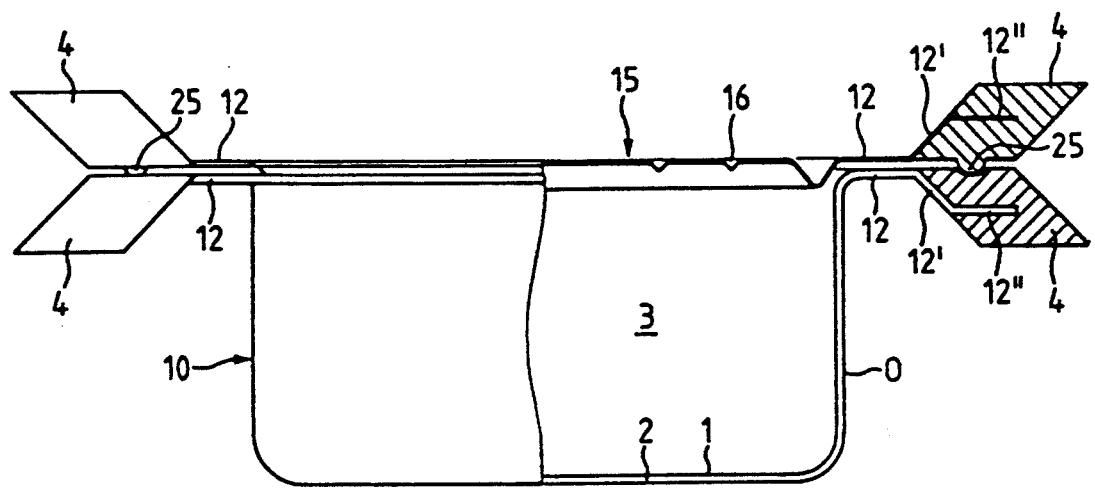
Figure 2B:
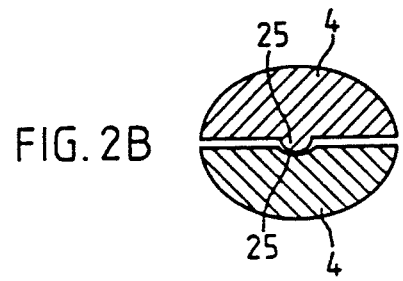
Figure 3:
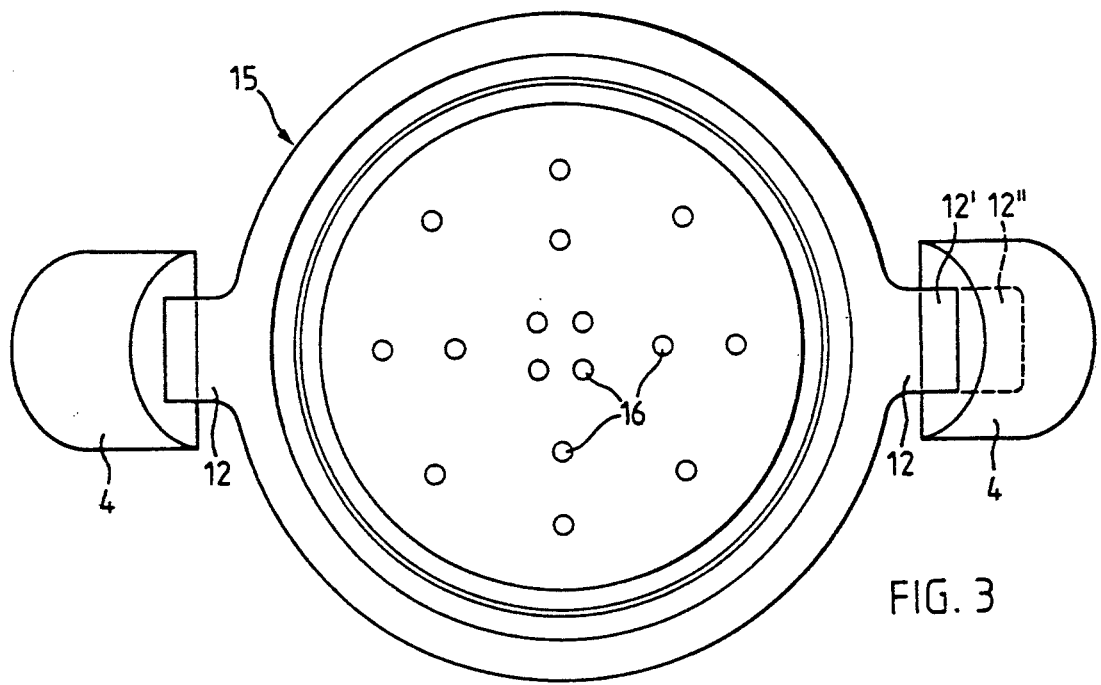

FIG. 3 The utensil according to FIG. 2 from above, i.e. viewing the lid.

Figure 4:
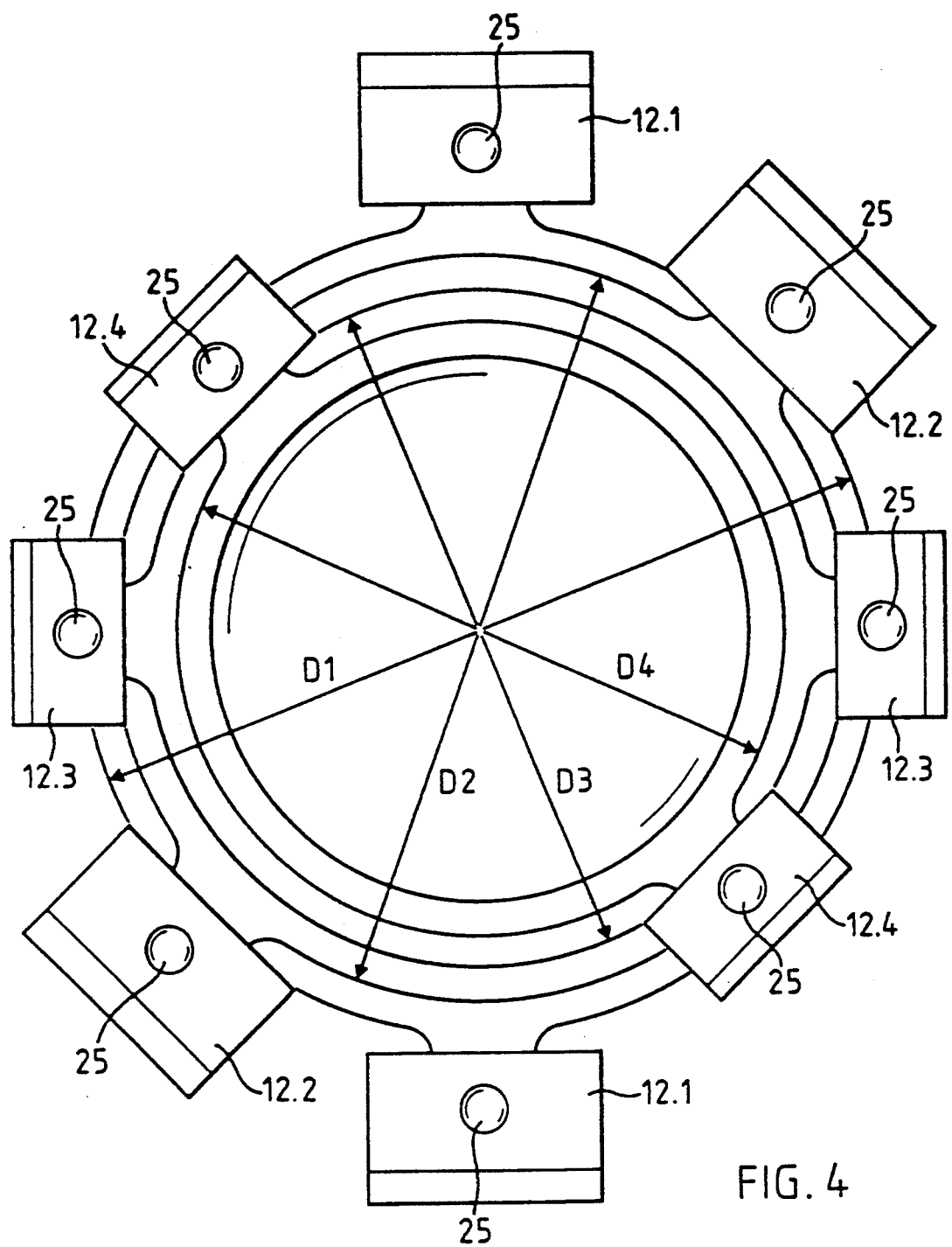

FIG. 4 Four containers placed in one another having different diameters and displaced handles, viewed from above.

Figure 5:
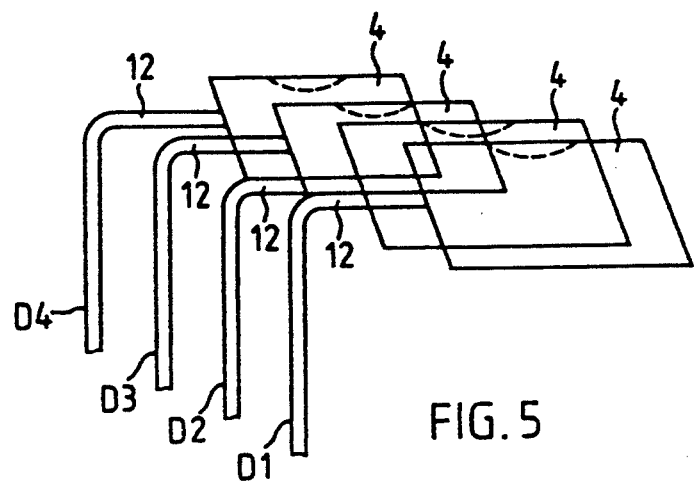

FIG. 5 A successive projection of the handles of the stacked containers according to FIG. 4 showing the characteristic nature of such a system utensil.

Figure 6:
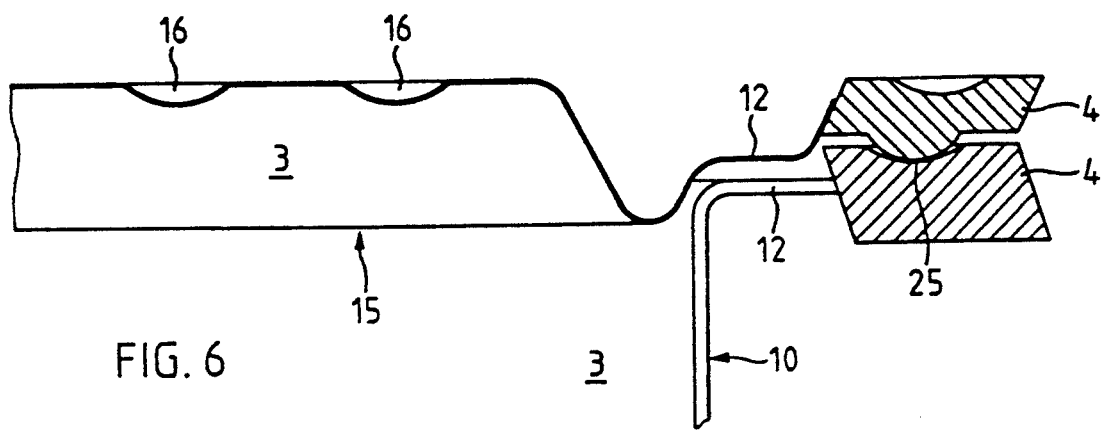

FIG. 6 The cooperation between the container and lid, the latter being raised.

Figure 7:
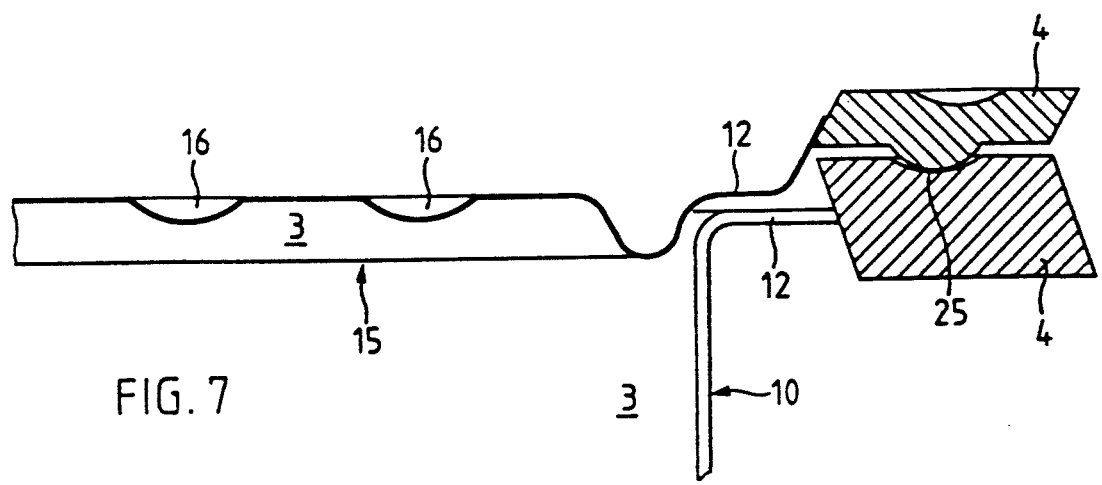

FIG. 7 The cooperation between the container and the lid, the latter being kept flat, which again shows the system character of the utensil.

FIG. 8 Diagrammatically and based on FIGS. 5, 6 and 7, the possibility of vertical variations, made possible by the shaping of the handle attachments on the vessel rim.

FIG. 1 shows in the sequence A to D relative to the formation of a material, in this case a laminated material (FIG. 1A), which comprises a good heat conducting core material 2 and thin stainless steel 1 plated on either side. The laminated material is e.g. cut to size as a square plate (FIG. 1B) and is deep drawn in this form. The deep drawn part (FIG. 1C) with the still uncoated rim 5 and the vessel interior 3 appears from above in the manner shown in FIG. 1D. The drawn in profile line 6 illustrates the subsequent cutting of the edge or rim of the vessel, together with the handle attachments. The waste 8 resulting from the cutting operation is smaller by the material of the surfaces for the handle attachments 12 than with conventional circular vessels. Fundamentally such a container can also be used as a lid (raised lid) or in other words, with respect to the shaping, a lid is manufactured in the same way as the vessel. From the shaping standpoint there need be no difference between the lid and the container of a utensil according to the invention. Laminated materials are used for the manufacture of the vessel parts of the utensil, whereas, although this is not prescribed, the lids are generally made from a single-layer material.

The preliminary product for the manufacture of a utensil according to the invention is characterized by its special shaping, the handle attachments 12 being subsequently shaped onto a vessel blank. The blank here comprises a laminated material consisting of three layers, namely outer layers 1 (surface layers) and a central layer 2 positioned between them (heat conducting layer). The surface layers are preferably made from a material, which in an optimum manner meets the surface requirements and the heat conducting layer is made from a material, which in an optimum manner meets the heat storage and distribution requirements. These individual layers are combined by a known process to form a starting material. The surface layers can be made from high-quality steel which, as a thin sheet in the cooking utensil, externally and internally protects the surface, whereas the heat conducting layer can be made from a good heat conducting material, e.g. aluminum which, as a correspondingly thicker sheet in the cooking utensil, stores and distributes heat. Compared with aluminium high-grade steel is a poor heat conductor if it were used in a thickness which would give the utensil the necessary stability to enable the shaping of handles on the marginal portion of the utensil and in this case the uniform heat distribution in the utensil would be inadequate and the weight too high and if this was brought about by heat storing aluminium only then the surface characteristics would be inadequate and the utensil would also have a much lower strength than when combined with high-grade steel.

Unlike in the case of cooking utensils with encapsulated bottoms this cooking utensil is fully encapsulated except for the handles. This can be seen in FIG. 1C which, following a deep drawing process, shows such a fully encapsulated utensil with an inner area 3. Particular reference is made to the fact that through the handle attachments fitted in the corners of the starting material, material can be saved, there is less waste and no additional material is required for the handle fixing fittings, which has a cost-saving action in view of the expensive starting material. As a result of the shaping of the handle attachments 12 (FIGS. 2A and 3) on the blank, during the subsequent processing to the finished product, it is possible to economize certain operations serving solely a handle fitting function. Thus, this measure leads to a cooking utensil requiring less material and labour costs and which also has better characteristics with respect to the utensil geometry and heat balance.

FIG. 2A shows in section such a utensil with a vessel 10 (as the end product) 7ith an engaged, associated lid 15, in which the two handles 4 are fixed to the vessel rim extension 12. There are possibilities for the shaping of e.g. straight extensions (12 on the left-hand side of the drawing) or bent extensions (12/12'/12" on the right-hand side of the drawing), which form the handle attachments. There are no limitations with respect to this shaping, in the same way as handles riveted or welded to a similar vessel. Any random configuration can be given. The handle attachments 12 according to the invention must be produced in the same operation as the vessel, but still have the described advantages in spite of the savings. The handle attachments 12 (or 12/12'/12") for the vessel handles 4 are shaped in the same way on the lid, but here without using an encapsulated material.

FIG. 2B shows a special shaping of the vessel handle 4, namely either 7ith a trough-shaped depression or a spherical protuberance, both designated 25. When the handles are engaged on one another, they prevent reciprocal displacement between the lid and the container and space the vessel 10 and lid 15 from one another for forming a pouring and steaming opening. This special shaping (depression/protuberance) can also be fitted on the handle attachments 12, 12' or 12" for fulfilling the same function.

FIG. 3 shows the utensil according to FIG. 2 from above. It can be seen that the shaping for the vessel and the lid can be the same. As the lid does not have to satisfy the same requirements regarding strength and heat distribution, it is mainly a question of its shaping within the system geometry. The logical shaping for system utensil purposes is made apparent by the fact that when viewed from above the vessel without the lid appears the same.

FIG. 4 shows four vessels fitted into one another, which are of the same type but of different sizes. The individual containers have the external diameters D1 to D4, the handles are designated 12.1 to 12.4 and between the handle attachment 12 and the handle 4 (FIG. 3) no distinction is made at this point. On the top of the handles it is possible to see the depressions 25, in which can be inserted the matching protuberances on the lid handle. This detail has already been discussed in conjunction with FIG. 2B.

These utensils are inserted in one another up to the vessel rim, as is shown by a detail according to FIG. 5. FIG. 5 shows in a successive projection of the handles of the stacked containers according to FIG. 4, how the latter can be placed in one another. The characteristic nature of this system utensil is also readily apparent. Such a space-saving stacking would not be possible with handles not fixed to the vessel rim. Numerous further possibilities regarding handling and ergonomy result from these characteristics and can be constantly extended through the use of such vessels. The space-saving stacking extends to such an extent that the volume of such a utensil set corresponds to the volume of the largest vessel.

FIGS. 6 and 7 show possible constructions of the vessel handles of vessel and lid in such a way that they can together assume special functions. If the vessel and lid handles are superimposed, so that the protuberances 25 are engaged in the depressions 25, the lid rim is raised from the vessel rim. In this position the lid can be tilted over rotation points formed by the spheres in the depressions 25, so that between the lid and vessel rim on one side a pouring or sieving opening is formed and on the other side a ventilating gap.

FIG. 6 shows a variant with a raised lid 5, which is placed on the container 10. From the shaping standpoint the lid 15 can be fundamentally the same as the container 10. As a function of the thermal and/or stability requirement it is either produced only from a sheet material with shaped on handle attachments, or from a laminated material in the same way as the container and in this case can be used as a cooking utensil. This fundamental similarity is represented by the same reference numeral 3 for the inner area of a lid or a container of the utensil. The height of the raised lid can have a random depth and in itself forms a container, because the handle arrangement of the openings of the container and the lid can be the same. As regards shaping there is no significant difference between the container and the lid, the materials to be used for production differing only as a result of the different uses.

FIG. 7 shows a variant with a flat lid 15 or in other words with a smaller inner area 3. In this form the lid can scarcely be used as a container and it is usually only made from a single sheet (not laminated material) with shaped on handle attachments. However, here again there is symmetry at the container opening as a result of the shaping to a system utensil.

Both lid variants of FIGS. 6 and 7 have the same handle requirements. The spherical protuberance 25 on the underside of the lid handle 4 and the trough-shaped depression 25 on the top of the vessel handle permits an engagement of the lid in a raised position with respect to the container, so that as a result of a lid tilting movement on one side a pouring and sieving opening is formed, whilst on the other side a ventilation gap is formed. This is only possible because the handles are directly fitted to the marginal part of the utensil and are consequently arranged with the correct relationship to the lid handles. It is also apparent that the vessel handles on the upper vessel rim or the marginal part of the vessel are precisely in the correct location for obtaining numerous advantages. If the handles are not superimposed, then the cooking vessel is sealed by the lid resting directly on the vessel rim.

If the lid shaping, in the manner shown in FIG. 2A, is chosen in such a way that the lid surface 15 is constructed as a plane, it becomes possible to place on such a lid a second cooking vessel for keeping hot and energy saving purposes. This is once again only possible because the lid handles and also the vessel handles are located on the marginal portion and there is no centrally positioned lid grip.

As is shown by the reference numeral 16 in FIG. 3 and in the section of FIGS. 6 and 7, lids constructed in a plane can be provided with uniformly arranged, downwardly directed troughs 16, which on the one hand stabilize the lid plane and on the other allow the uniform dripping off over the cooking product of water of condensation formed during cooking.

FIG. 8 shows vertical variations (i.e. handle attachment shapings for varying the height of the handles with respect to the vessel rim with one or more steps) of shaped handle attachments, making it possible to vary the reciprocal functions of the utensil parts between individual vessels (bain marie cooking) and between the vessel and the lid (cooking/pouring), etc. The vessel wall 10 with the handle attachment 12 and the handle extension 12' and 12" are shown in FIG. 8 in different steps $S_1$ to $S_n$ on the vertical V according to which the handle part can be shaped.

Thus, two vessels 10 can differ as regards diameter and as regards the shaping of the handle attachments 12, 12' and 12" and the handle heights $S_1$ to $S_n$. If the smaller vessel with the lower surface of the handle 4 rests on the upper surface of the larger vessel handle 4, a gap is formed between the bottom surfaces of the vessels, which is e.g. one of the positions for bain marie or double saucepan cooking. If two vessels of different diameters with reciprocally displaced handles are placed in one another so that the handles are no longer superimposed, then the smaller container with its handle attachment 12 would rest on the rim of the larger vessel, so that the vessel bottoms would be spaced by the height difference between the two vessels. This would represent the stacking position with the maximum stacking density (cf. also FIG. 5) and also a further position e.g. for bain marie cooking. The vessel-lid matching or coincidence e.g. makes it possible to turn round the utensil in the manner shown in FIG. 6, so that the lid functions as a flat vessel and the previous vessel functions as a deeply curved lid. From the use standpoint it would e.g. constitute a poultry cooking means. In this way, on the one hand with the shaping of the handle attachments on the vessel rim and on the other with the variation of the handle shaping, from the utensil according to the invention is developed a significantly extendable system utensil, which is subject to numerous variations and uses. Together with the laminated material further additional advantages are obtained, which further extend the system content.

It can be seen that the special shaping, the special arrangement of the handles or grips, the choice of materials (thermal and strength characteristics), as well as the cooperation between the different vessel and lid parts lead to a universal cooking utensil system. It has wider uses than conventional utensils, as is apparent from a comparison of standard functions such as the interaction of the container and the lid, e.g. for pouring, sieving or steaming, or the fitting into one another of two containers for bain marie cooking, which is readily possible as a result of the special container design and the improved stability of such vessels, which are very space-saving with regards storage, transportation (packing) and in the kitchen. The aforementioned measure leads to all these characteristics.

I claim:

1. A metal utensil comprising a single unitary sheet of metal material deep-drawn into a vessel comprising
   a first container part including a circular wall defining an interior volume and an outer surface, said wall having an edge defining an open top,
   a continuous flange extending radially outwardly from said edge,
   means comprising first and second continuations of said flange extending radially outwardly from opposite sides of said flange forming root portions of handles each having a manually graspable handle portion at an outer end thereof, each said root portion lying in the same plane as said flange and being elongated so that a user's hand grasping said handle portion is spaced from said outer surface,
   a second container part having a central portion, a continuous second flange extending radially outwardly from said central portion and means comprising first and second continuations of said second flange extending radially outwardly from opposite sides of said second flange forming root portions of handles, each said root portion lying in the same plane as said flange and having a manually graspable handle portion at an outer end thereof by which said second container part can be manually grasped; and means at each said handle portion forming positioning surfaces for positioning said second container part on said first container part so that when said second container part is placed on said first container part with said handles of said container parts aligned, said flanges are spaced apart and when said second container part is placed on said first container part with said handles of said parts separated by at least a predetermined angle, said flanges abut.

2. A utensil according to claim 1 wherein said manually graspable portion includes a thermally nonconductive member attached to said root portion.

3. A utensil according to claim 2 wherein said positioning surfaces on said handle portions of said first container part include an upper surface with an upwardly facing arcuate recess.

4. A utensil according to claim 1 wherein each said handle portion of said first container part includes an upper surface with an upwardly facing arcuate recess and said handle portion of said second container part includes a surface having an arcuate protrusion, the distances between said recesses and between said protrusions being substantially equal so that when said second container part is placed as a lid on said first container part said protrusions mate with said recesses and form spaced bearing points at said handles about which said lid is pivotable to create an opening on one side between said container parts.

5. A metal utensil set comprising a first container part formed from a single unitary sheet of metal material deep-drawn into a vessel including a circular wall of a first diameter defining an interior volume and an outer surface, said wall having an edge defining an open top, a continuous first flange extending radially outwardly from said edge and having a second diameter, means comprising first and second continuations of said first flange extending radially outwardly from opposite sides of said first flange forming root portions of handles each having a manually graspable handle portion, each said root portion lying in the same plane as said first flange and being elongated so that a user's hand grasping said handle portion is spaced from said outer surface, a second container part having a central portion with a third outer diameter smaller than said first diameter, a continuous second flange extending radially outwardly from said central portion and means comprising first and second continuations of said second flange extending radially outwardly from opposite sides of said second flange forming root portions of handles each having a manually graspable handle portion at an outer end thereof by which said second container part can be manually grasped, said root portions lying in the same plane as said flange and extending to a diameter greater than said second diameter;

a cover having a central portion, a continuous third flange extending radially outwardly from said central portion and means comprising first and second continuations of said third flange extending radially outwardly from opposite sides of said third flange forming root portions of handles, each said root portion lying in the same plane as said third flange and having a manually graspable handle portion at an outer end thereof by which said cover can be manually grasped;

whereby when said second container part is placed on said first container part and said cover is placed on said second container part with said handles of said container parts and cover separated from each other by at least a predetermined angle, said root portions of said second container part rest on said first flange of said first container part and said root portions of said cover rest on said second flange of said second container part.

* * * * *